L. BURGESS.
PROCESS FOR PRODUCTION OF ZIRCONIUM COMPOUNDS.
APPLICATION FILED AUG. 16, 1921.
1,418,528.    Patented June 6, 1922.
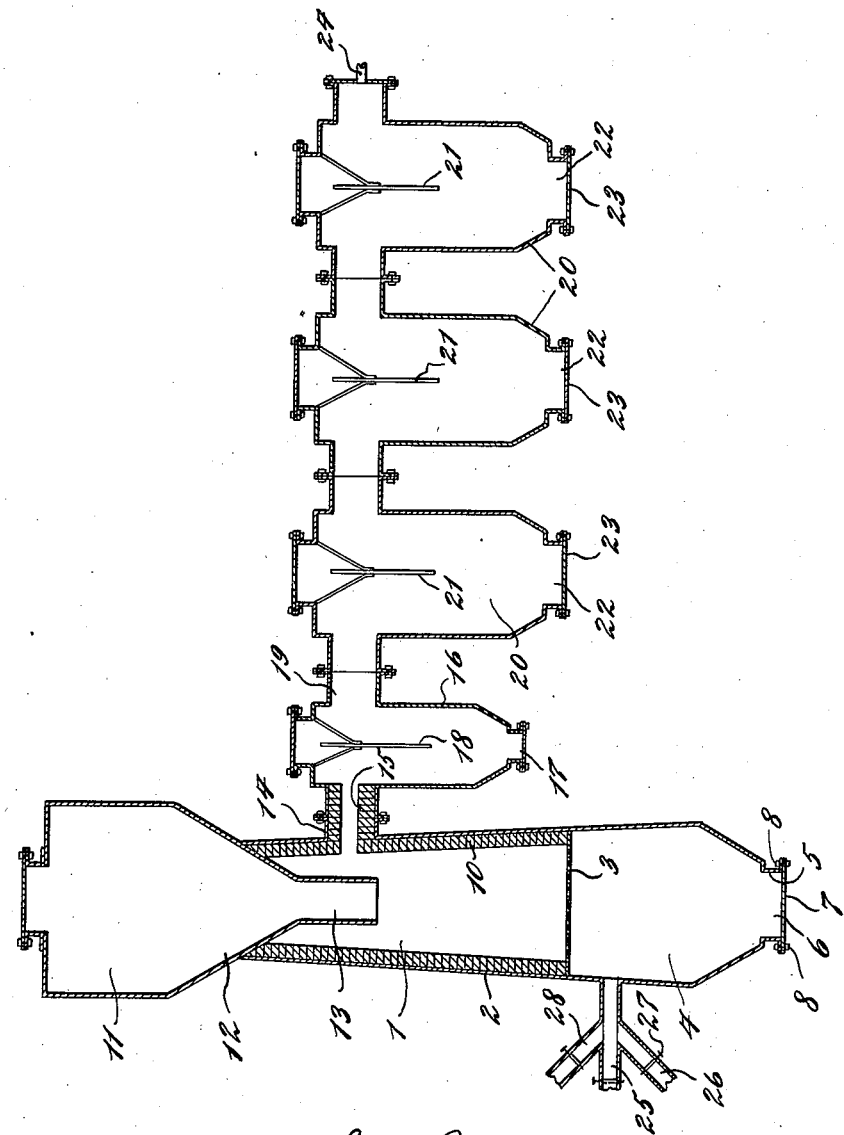

UNITED STATES PATENT OFFICE.

LOUIS BURGESS, OF BAYONNE, NEW JERSEY.

PROCESS FOR PRODUCTION OF ZIRCONIUM COMPOUNDS.

1,418,528.  Specification of Letters Patent.  Patented June 6, 1922.

Application filed August 16, 1921. Serial No. 492,823.

*To all whom it may concern:*

Be it known that I, LOUIS BURGESS, a citizen of the United States, residing at Bayonne, in the county of Hudson and State of New Jersey, have invented certain new and useful Improvements in Processes for Production of Zirconium Compounds, of which the following is a specification.

My invention contemplates the provision of a process which, by a simple series of steps, will permit satisfactory recovery of substantially pure zirconium oxid, and zirconium chlorid from the crude ore known as zirkite. This ore contains approximately 80 per cent zirconia (ZrO) and 20 per cent silica ($SiO_2$), and according to the preferred form of my invention, I take the crude ore zirkite and, by any suitable means, mix it with a suitable hydrocarbon bonding agent, employing for this purpose about 80 parts by weight of the said crude ore to about 40 parts by weight of petroleum pitch, which, on heating, yields 20 parts of carbon. The ore may be mixed with said pitch by any suitable means, care being taken to thoroughly disseminate the pulverized ore through the body of pitch or bonding agent. I preferably employ for this purpose a tube or pebble mill grinding the mass to pass a 50 mesh to the inch screen, or finer. The mixture is then coked by heating the same to a red or yellow heat in a suitable retort, and preferably in a reducing atmosphere. When the mixture is properly coked I then grind the same by any suitable means until it is reduced to particles, some about 1 cubic inch maximum size.

The ground coke mixture of crude ore and carbon is then placed in an electric furnace, preferably operating on the arc principle, and by the heat of the arc is reduced, the heating temperature in which the reducing action is performed being maintained preferably at a pressure of about 15 pounds above atmospheric. In performing the reducing step, I may use any suitable form of arc furnace capable of producing the desired temperature and of maintaining the pressure mentioned, but I prefer to employ a furnace of the general type of construction shown in my application, Serial No. 409,589, filed September 11, 1920. The product resulting from the reduction step described, when employing the proportions mentioned, is a silicid ($Zr_2Si$) or an alloy of zirconium and silicon. If more than 20 parts of carbon are used the zirconium is partially or completely converted into zirconium carbid ($Zr_2C$). Whichever of the products, either the silicid or carbid, is produced, the same is ground to a maximum size of about $\frac{1}{2}$ inch, and is then treated with dry hydrochloric acid gas in the presence of heat to initiate an exothermic reaction, resulting in the production of zirconium chlorid, as well as ferrous chlorid ($FeCl_2$). The silicid or carbid may, however, be finely pulverized and admixed or disseminated throughout the gaseous hydrochloric acid, either in the reaction chamber or before entering the same, further quantities of pulverized silicid or carbid and hydrochloric acid being supplied as consumed. By this procedure a very complete reaction is produced. The apparatus for this procedure may be the same as that shown in my copending application, filed under even date herewith. If any iron be present in the charge, the vapors of the chlorids are conducted off from the reaction zone and subjected to condensing conditions, namely, from approximately 300° C. to 500° C., that is, above the sublimation temperature of zirconium chlorid, but below the sublimation temperature of ferrous chlorid, under which conditions the ferrous chlorid will be deposited or condensed and vapor of zirconium chlorid may be removed for condensation at a suitable temperature at another point. The zirconium chlorid when finally condensed is recovered in a substantially pure condition, and upon treatment with a theoretical quantity of water will be converted into zirconium oxid and hydrochloric acid. If any aluminum chlorid is evolved in the main reaction, some aluminum oxid may be present after the treatment with water just described, but such aluminum oxid may be removed from the zirconium oxid by digestion with concentrated soda or potassium hydrate, in which the aluminum oxid is soluble, but which has no effect on zirconium oxid.

As heretofore stated, the process may be carried out in any suitable form of apparatus, but I prefer to employ that shown in the accompanying drawings, wherein such apparatus is shown in elevation and vertical section.

Referring to said drawing, 1 designates a reaction chamber or furnace, comprising a vertical shell or stack 2, preferably constructed of steel, and the interior of which is divided by horizontal open-work partitions or grates 3 to form said chamber 1, and a lower chamber 4, the base or lower end of the stack colliding with a collection bucket 5 having discharge opening 6 provided with a closure plate 7 detachably held in position to close the opening 6 by any suitable means, such as clamping bolts 8 passed through said plate, and a flange on the lower end of the stack. Above the partition or grate 3 the portion of the stack surrounding the reaction chamber 1 is lined with fire-brick 10, or other refractory material which will withstand the heat conditions and the requirements of the reaction. The upper portion of the stack is provided with supply hopper 11, of any suitable form of construction, and preferably provided with a funnel-shaped bottom 12, from which leads a supply spout 13 opening downward into the reaction chamber 1. This hopper 11 is adapted to contain the zirconium silicid or carbid employed, and to feed the same to the reaction chamber 1 to subject said material to the action of hydrochloric acid gas. Leading from the reaction chamber, and preferably from the upper portion of the latter, is an outlet duct 14, also preferably lined with refractory material 15, said duct being arranged to discharge volatile reaction products from the reaction chamber 1 into an initial condenser 16 constituting the first of a series of condensers. This chamber may be provided with a suitable discharge, as shown at 17, and also with a baffle 18 to insure circulation of the volatile products in the condensing chamber. This condenser 16 is maintained at a temperature preferably above 300° C. up to approximately 500° C., that is, above the sublimation temperature of zirconium chlorid, but below the sublimation temperature of ferrous chlorid, so that the ferrous chlorid will be condensed in said condenser, and the zirconium chlorid be permitted to pass on to suitable condensing means, by means of which it may be condensed. The fumes of zirconium chlorid pass out of the condenser 16 through a duct 19 leading to one or more condensers 20, all containing baffles 21, which condensers are maintained at a temperature below that at which zirconium chlorid sublimes, the temperature of said condenser being preferably at or below 150° C. the fumes of zirconium chlorid will be condensed in the said condensers 20, and may be recovered therefrom through discharge openings 22 closed by detachable cover plates 23 during the condensation operation. The final condenser may be provided with an outlet pipe 24, by means of which remaining gases may be discharged after the zirconium chlorid is condensed. In carrying out the reaction with hydrochloric acid, the furnace or reaction chamber 1 is supplied with combustible material, preferably petroleum coke, and is ignited and burned until the furnace and fire-bed will be heated to approximately a yellow heat so that there will be sufficient heat energy in the furnace and fire-bed thereof to initiate a reaction between the charge of zirconium silicid or zirconium carbid with hydrochloric acid gas. During this heating air may be fed to the furnace through a pipe 25 opening into the chamber 4. As soon as the furnace is completely heated, the products of combustion may be displaced therefrom by means of hydrogen, or any suitable still or hydrocarbon gas which will not react with zirconium, said gas being supplied through a pipe 26 opening into pipe 25, and provided with a control valve 27. The zirconium silicid or carbid is then dropped into the furnace from the hopper 11 upon the fire-bed, whereupon, the valves in the pipes 25 and 26 are closed, and hydrochloric acid gas is fed through a pipe 28 to the pipe 25, whence it passes into the chamber 4 and up through the grate into contact with the heated zirconium silicid or carbid. As soon as the hydrochloric acid gas contains the charge, an exothermic reaction takes place generating volatile zirconium chlorid ($ZrCl_4$), which passes out of the stack or reaction chamber through the duct 14 and into the condenser 16. If any iron is present, ferrous chlorid is also formed, which also passes into the preliminary condenser 16, as do all volatile products resulting from the reaction. As heretofore stated, the preliminary condenser is maintained at a temperature of from 300° C. to 500° C., which is sufficient to cause condensation of the ferrous chlorid, but is not low enough to result in the zirconium chlorid being condensed. The volatile zirconium chlorid passes out of the preliminary condenser and through the duct 19 into the second condenser of the series, wherein it is condensed, or partially condensed, and may be removed. If any of the volatile zirconium chlorid is not condensed in the second condenser it passes on to subsequent condensers which are maintained at a low enough temperature to condense the zirconium chlorid to below 150° C. The sublimation temperature of zirconium chlorid is about 169° C.

What I claim and desire to secure by Letters Patent of the United States is:—

1. The process which consists in treating an oxidized ore of zirconium with carbon and heat to produce a compound of zirconium and a member of the carbon group, and reacting upon said compound with gaseous hydrochloric acid to produce zirconium chlorid.

2. The process which consists in treating zirkite with carbon and heat to produce a compound of zirconium and a member of the carbon group, and reacting upon said compound with gaseous hydrochloric acid to produce zirconium chlorid.

3. The process which consists in treating an oxidized ore of zirconium with carbon and heat to produce a compound of zirconium and a member of the carbon group, reacting upon said compound with gaseous hydrochloric acid to produce zirconium chlorid, and condensing the zirconium chlorid from the gaseous product.

4. The process which consists in treating an ozidized ore of zirconium with carbon and heat to produce a reduction product of zirconium, reacting upon said product with gaseous hydrochloric acid to produce volatile zirconium chlorid, and condensing said zirconium chlorid.

5. The process which consists in treating an oxidized ore of zirconium with carbon and heat to produce a reduction product of zirconium, subjecting said product to gaseous hydrochloric acid under conditions resulting in an exothermic reaction producing volatilized zirconium chlorid, and conducting away and recovering zirconium chlorid by condensation.

6. The process which consists in treating an oxidized ore of zirconium with carbon and heat to produce a reduction product of zirconium, subjecting said product to gaseous hydrochloric acid under conditions resulting in an exothermic reaction producing volatilized zirconium chlorid, conducting away and recovering zirconium chlorid by condensation, and treating the zirconium chlorid with water to produce substantially pure zirconium oxid.

7. The process which consists in treating an oxidized ore of zirconium with carbon and heat to produce a reduction product of zirconium, subjecting said product to gaseous hydrochloric acid under conditions resulting in an exothermic reaction producing volatilized products including volatilized zirconium chlorid, conducting said products away from the zone of reaction and subjecting them to condensation at a temperature above the sublimation temperature of zirconium chlorid to separate out the volatilized zirconium chlorid, and then conducting the volatilized zirconium chlorid away and subjecting it to conditions whereby it is condensed.

8. The process which consists in treating an oxidized ore of zirconium with carbon and heat to produce a compound of zirconium and a member of the carbon group, and reacting upon said compound in pulverized form with gaseous hydrochloric acid to produce zirconium chlorid.

9. The process which consists in treating an oxidized ore of zirconium with carbon and heat to produce a compound of zirconium and a member of the carbon group, and reacting upon said compound with gaseous hydrochloric acid to produce zirconium chlorid by suspending said compound in pulverized form in said acid.

In testimony whereof I have hereunto signed my name in the presence of two subscribing witnesses.

LOUIS BURGESS.

Witnesses:
AGNES E. CUNNEEN,
C. G. HEYLMUN.